United States Patent [19]

King

[11] Patent Number: 5,289,899
[45] Date of Patent: Mar. 1, 1994

[54] APPARATUS AND METHOD FOR LUBRICATING CONVEYORS

[75] Inventor: William J. King, Orange, Calif.

[73] Assignee: Pure-Chem Products Company, Inc., Stanton, Calif.

[21] Appl. No.: 993,613

[22] Filed: Dec. 21, 1992

[51] Int. Cl.⁵ .............................. F16N 13/22
[52] U.S. Cl. ...................... 184/12; 184/7.4; 184/15.2; 184/15.3; 184/39.1; 198/500
[58] Field of Search .......... 184/6.1, 7.4, 12, 15.1, 184/15.2, 15.3, 39.1; 198/500, 501, 832; 137/624.13; 251/29; 239/67, 69; 417/278; 222/386

[56] References Cited

U.S. PATENT DOCUMENTS

| | | | |
|---|---|---|---|
| 3,503,470 | 3/1970 | Lister | 184/15.1 |
| 4,064,970 | 12/1977 | Reeves | 184/15.3 |
| 4,324,316 | 4/1982 | Thrasher, Jr. et al. | 184/29 |
| 4,537,285 | 8/1985 | Brown et al. | 184/6.1 |
| 4,893,697 | 1/1990 | Tosi | 184/7.4 |
| 5,129,481 | 7/1992 | King | 184/15.3 |

FOREIGN PATENT DOCUMENTS 444327  5/1927  Fed. Rep. of Germany ..... 184/15.2

Primary Examiner—Thomas E. Denion
Attorney, Agent, or Firm—Willie Krawitz

[57] ABSTRACT

An air actuated apparatus and method for lubricating conveyors such as chains and belts is disclosed, comprising a device including air actuated valves which are alternately opened and closed by a drive system powered from the conveyor movement. The drive system is connected to a delay valve which controls a fluid valve that enables lubricating solution to be applied to the conveyor. The apparatus and method are particularly suited for conveyors operating at high speed, and may also be used to control a plurality of lubricating applicators for different conveyors in a plant.

10 Claims, 1 Drawing Sheet

APPARATUS AND METHOD FOR LUBRICATING CONVEYORS

BACKGROUND OF THE INVENTION

This invention relates to a new and improved lubricant applicator for conveyor systems, especially in large facilities used in food processing, packaging plants, and the like. Typically, conveyors contemplated by this invention are used in food canning and soft drink manufacturing facilities, breweries, packaging facilities, dairies, etc. Moreover, this invention can be employed in industrial operations in general.

Conveyors employed in some of the large facilities noted above are generally very long, and some can extend for as much as several hundred feet; the conveyor components themselves are also very heavy. If they are not lubricated, the conveyors will become excessively worn and ultimately break. If this occurs, and because conveyors can operate with heavy loading and under high tension, chain breakage is extremely dangerous. As a result, the industry practice is to over-lubricate these conveyors, which is not only expensive, but in addition, excessive lubricant causes a slippery condition that is dangerous to personnel.

It would be preferable to eliminate the need to lubricate a conveyor when a particular section of a conveyor system is shut down, either temporarily during a run, or for periods of time, say during a shift change, or for repairs, and during routine maintenance, etc. This would result in lubricant savings and also reduce sewage charges due to excessive use.

In Applicant's U.S. Pat. No. 5,129,481 issued Jul. 14, 1992, there is described a conveyor driven system which connects through a bladder accumulator which feeds lubricant through nozzle applicators and onto the conveyor, the application times being controlled by the conveyor movement.

The patented system is adapted t replace conventional electrical actuated devices which are expensive, and subject to electrical breakdowns due to moisture accumulation which causes maintenance problems and slows down plant operations.

One problem arising with bladder accumulators is that the response time of the accumulator is not sufficiently rapid to feed the lubricant in a pulsating manner to a very rapidly moving conveyor system. Instead, the bladder accumulator applies lubricant continuously to the rapidly moving conveyor rather than on an intermittent or pulsating basis, and this type of operation precludes an effective control of lubricant application.

In addition, each station where lubricant is applied requires a bladder accumulator and associated equipment. However, it would be preferred to use a single lubricant applicator system to service, say, multiple lubrication stations instead of only a single station.

Also, it would be preferred to control the application of lubricant, not only to a rapidly moving conveyor, and to control multiple lubrication stations, but also to avoid the use of an electrically controlled applicator system.

THE INVENTION

According to the invention, there is provided a lubricating system including an air-driven, delay valve or relay which is driven from the conveyor system to be lubricated, and which connects to a counter which controls a valve that passes lubricant in a pulsating or intermittent fashion from a lubricant feed supply to the conveyor.

When the conveyor is not moving, the feed supply will be turned off, and when the conveyor is in motion, the amount of lubricant supplied to the conveyor will depend on the conveyor speed. Since the response times of the system are very rapid, say about 10 milliseconds, it is easily accommodated by the lubricating system of this invention and produce pulses which will suitably lubricate a conveyor moving at speeds of up to about 1,000 ft./min.

Moreover, the system can be used to control a number of conveyors from a single station, and this will of course reduce overall costs of a lubricating system for a plant.

DESCRIPTION OF THE PREFERRED EMBODIMENTS

Figure 1:
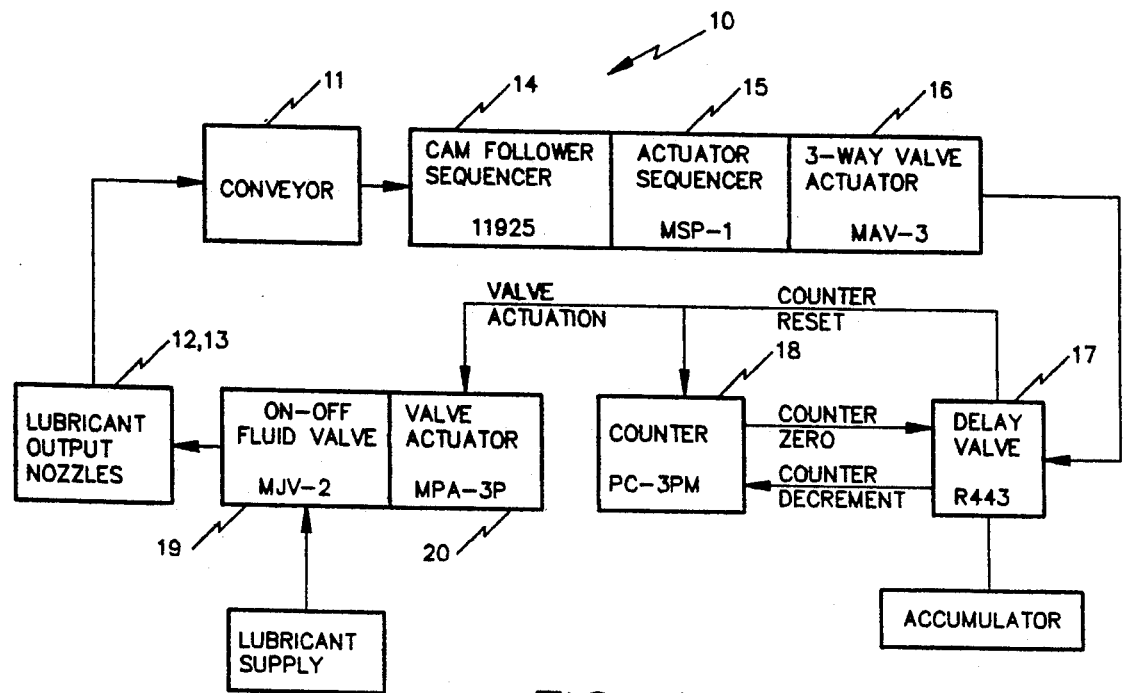
FIG. 1 is a flow diagram showing the lubrication system of this invention.
Figure 2:
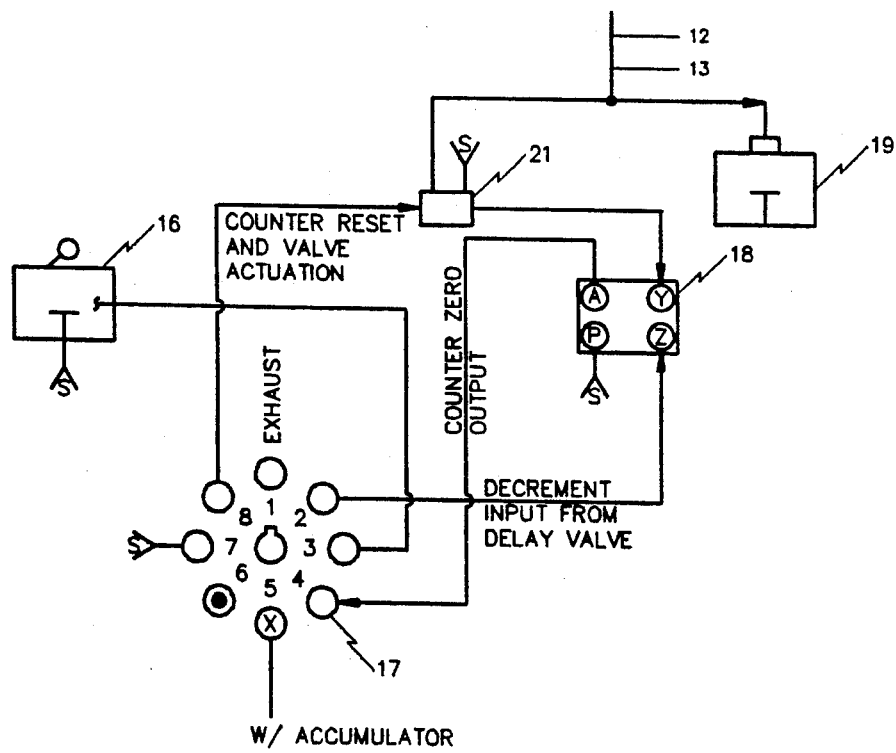
FIG. 2 is a flow diagram showing the connections between major components of the system.

A system flow diagram 10 of this invention and the connections between specific components are shown in FIGS. 1 and 2, and the component catalogue listings shown in FIG. 1 are supplied by Clayton Controls. The system flow diagram comprises a conveyor 11 which is lubricated from one or more nozzles 12, 13; suitable nozzles are described in Applicant's U.S. Pat. Nos. 5,033,676 and 5,115,978.

A cam follower 14 is driven by the conveyor 11 such as a belt or a conveyor shaft drive, and the cam follower is air connected to an actuator sequencer 15 which sends an air, actuating signal to a normally closed, three-way valve actuator 16. The signal from the sequencer 15 will open valve 16 which then sends an actuating air signal to a delay or pilot valve 17 that corresponds to each revolution of the cam follower.

A counter 18 is pre-set to determine the number of revolutions the cam follower 14 undergoes before lubricant is fed to the conveyor, and each revolution of the cam follower will cause the counter to decrement to zero from its initial pre-set number. When the counter reaches zero, a counter zero signal is sent to the delay valve 17 and an 'on' signal will then be sent from the delay valve to a normally closed, on-off fluid valve 19; also, a counter reset signal is sent from the delay valve to the counter.

As shown in FIG. 2, an air actuated auxiliary valve 21 may be employed to ensure that an air pulse of sufficient force is applied from delay valve 17 to either reset the counter and/or turn on the fluid valve 19.

The fluid valve 19 is actuated by a valve actuator 20 which is set to open when a pre-set minimum pressure is applied from the delay valve. Pulse signals from the counter and on-times of the delay valve are preset to accommodate for lubricating requirements of the conveyor. Three-way valve 16, delay valve 17, counter 18, valve 21 and a lubricant supply are driven by pressurized air (S) from a common source such as a compressor (not shown).

Thus, actuation on-times for the nozzles are set by controlling the pulse reset times of the counter 18, while an accumulator is employed to maintain suitable pressure levels of the delay valve 17. Hence, the counter reset times will control the time between each 'on' pulse signal from the delay valve, while the delay valve and accumulator settings will control the duration of each pulse, during which time lubricant solution is applied to the conveyor 11.

Consequently, during the on-time of fluid valve 19, lubricant will be applied from the lubricant supply to the nozzles and then to the conveyor, depending on the duration of the pulse from the delay valve to the fluid valve; also, counter 18 will determine time intervals between each pulse.

If desired, branch lubricating feed nozzles can be controlled in conveyors remote from conveyor 11 by teeing several delay valves in conjunction with the counter 18. This enables a single system to control the output of a plurality of feed nozzles to various conveyors which are likely to be moving at different speeds than conveyor 11. Consequently, less expense is incurred for additional components and corresponding maintenance, and fewer personnel are necessary to control the operation.

The use of branch lubricating feed nozzles also enables separately applying lubricant, germicides, fungicides, etc., to a conveyor, which is particularly useful, since germicides and fungicides are frequently incompatible with lubricants, and also tend to have a shorter shelf life than the lubricants into which they would otherwise be mixed. Thus lubricant would be supplied through nozzle 12 and germicides, etc. separately through nozzle 13.

I claim:

1. An air-actuated lubricating system, comprising:
   a) conveyor means adapted to move at various speeds;
   b) nozzle means for supplying pulses of lubricant to the conveyor means during movement thereof;
   c) rotatable cam follower drive means driven by the conveyor and adapted to produce air actuating output pulses corresponding to the conveyor means speeds;
   d) a normally closed, air-actuable, on-off valve actuator actuated by the cam follower drive means, the on-off valve being adapted to open and provide individual actuating output air impulses corresponding to the air actuation output pulses of the drive means which correspond to the conveyor speed, and to close when an air actuation pulse from the drive means is not present, the cam follower being connected to a sequencer which actuates the on-off valve actuator;
   e) a delay valve for receiving actuating output air impulses from the on-off actuator valve and to produce output air impulses corresponding to the output air impulses from the on-off valve;
   f) a counter for receiving the output air impulses from the delay valve, the counter being pre-set to a number which corresponds to a pre-set time interval between application of pulses of lubricant to the conveyor, the said pre-set number corresponding to the number of output air impulses from the delay valve which correspond to the conveyor speed, the counter being adapted to send a termination air impulse to the delay valve when the pre-set number has been reached; and,
   g) a normally closed fluid valve actuated by the delay valve and adapted to open and admit lubricant to the nozzles for lubrication of the conveyor upon receiving an impulse from the delay valve which corresponds to the termination air impulse from the counter to the delay valve, the fluid valve being adapted to close when the impulse from the delay valve is turned off, the fluid valve being actuated by a valve actuator, and the delay valve being operated in conjunction with an accumulator.

2. The lubricating system of claim 1, in which the counter is decremented from the pre-set number to a pre-set decrement number, each decrement corresponding to an air impulse from the delay valve, the counter being adapted to send a count termination signal to the delay valve when the decremented number has been reached; the delay valve thereby actuating the fluid valve and resetting the counter when the count termination signal is received from the counter; lubrication time intervals for the conveyor commencing when the said pre-set time interval commences, and lubricant duration times being determined by on-times of the delay valve.

3. The lubricating system of claim 1, in which the system has a response time of approximately 10 milliseconds and the conveyor speeds vary up to approximately 1,000 ft./minute.

4. The lubricating system of claim 1, in which the lubricant nozzle means comprises at least one nozzle.

5. The lubricating system of claim 1, comprising a counter decrement from the pre-set number to zero, and a termination air impulse sent to the delay valve being a zero pulse signal.

6. The lubricating system of claim 1, comprising separate nozzle means for applying lubricant, germicides and fungicides separately to the conveyor.

7. A method for lubricating a conveyor, adapted to move at various speeds, comprising: supplying lubricant to at least one nozzle for feeding pulses of lubricant to the conveyor; rotating a cam follower drive means from the conveyor, the drive means providing air actuating output pulses depending on the speed of the conveyor; feeding the air actuating output pulses to a normally closed, air actuable, on-off valve actuator, which opens when an actuating output pulse from the cam actuated drive means is present, and closes when the actuating output pulse is not present;

the cam follower being connected to a sequencer which actuates the on-off valve actuator; feeding corresponding air-actuating pulses from the on-off valve actuator to a delay valve; feeding air-actuating pulses from the delay valve corresponding to the output air impulses from the on-off valve actuator to an air-actuated counter having a pre-set number corresponding to the speed of the conveyor; decrementing the counter from the pre-set number to a decremented number corresponding to the interval between application of lubricant from the nozzle to the conveyor, and providing an air-actuated decremented pulse signal to the delay valve when the decremented number has been reached; and, resetting the counter and sending an air-actuating pulse to a normally closed fluid valve to open the fluid valve and supply lubricant to the nozzle for application to the conveyor, the open time of the fluid valve being pre-determined by the amount of lubricant to be supplied to the conveyor, and the interval between each application being determined by the interval between the pre-set number and the decremented number of the counter; the fluid valve being adapted to close when the air impulse from the delay valve is turned off, the fluid valve being actuated by a valve actuator, and the delay valve being operated in conjunction with an accumulator.

8. The method of claim 7, in which the conveyor has a response time of approximately 10 milliseconds and at a conveyor speed of up to approximately 1,000 ft./minute.

9. The method of claim 8, in which the decremented number is zero, and the decremented signal from the counter to the delay valve is a zero count signal.

10. The method of claim 7, in which lubricant, germicides and fungicides are supplied to the conveyor through separate nozzles.

* * * * *